United States Patent
Ancona et al.

(10) Patent No.: US 11,839,220 B2
(45) Date of Patent: Dec. 12, 2023

(54) AUTOMATIC TABLE-TOP MACHINE FOR KNEADING AND EXTRUDING PASTA

(71) Applicant: IMPERIA & MONFERRINA S.P.A., Rome (IT)

(72) Inventors: Enrico Ancona, Rome (IT); Massimo Franceschet, Rome (IT)

( * ) Notice: Subject to any disclaimer, the term of this patent is extended or adjusted under 35 U.S.C. 154(b) by 37 days.

(21) Appl. No.: 17/532,412

(22) Filed: Nov. 22, 2021

(65) Prior Publication Data
US 2022/0159973 A1 May 26, 2022

(30) Foreign Application Priority Data

Nov. 23, 2020 (IT) .................... 102020000028103

(51) Int. Cl.
*A21C 1/14* (2006.01)
*A21C 11/16* (2006.01)
*F16B 2/06* (2006.01)

(52) U.S. Cl.
CPC ............... *A21C 1/14* (2013.01); *A21C 11/16* (2013.01); *F16B 2/065* (2013.01)

(58) Field of Classification Search
CPC ......... A21C 1/14; A21C 11/16; A21C 1/1485; A21C 1/149; A21C 1/04; F16B 2/065; F16B 5/0635; F16B 5/0216; F16B 5/0225; F16B 5/123
See application file for complete search history.

(56) References Cited

U.S. PATENT DOCUMENTS

| | | | | |
|---|---|---|---|---|
| 5,460,506 A | * | 10/1995 | Price, IV | ................ A21C 1/06 425/197 |
| 2017/0112147 A1 | | 4/2017 | Porcari | |

FOREIGN PATENT DOCUMENTS

| KR | 20110011210 A | * | 7/2009 |
|---|---|---|---|
| KR | 20100002064 U | | 2/2010 |
| KR | 20110011210 A | | 2/2011 |
| KR | 20130003951 U | | 7/2013 |
| KR | 20220000214 U | * | 7/2020 |

OTHER PUBLICATIONS

KR20110011210A Description with Row Numbers Espacenet Machine Translation (Year: 2023).*

* cited by examiner

*Primary Examiner* — Susan D Leong
*Assistant Examiner* — Anna J. Perkins

(57) ABSTRACT

Automatic table-top machines for kneading and extruding pasta are disclosed. The present machines overcome problems associated with prior known automatic table-top pasta machines that exhibit safety problems in relation to a detachable connection of a dough forming tank. The present invention provides one or more automatic table-top machines for kneading and extruding pasta of the specified type, which allows, among other advantages, an operator to carry out the assembly and disassembly operations of a dough forming tank in a safe and easy manner.

10 Claims, 17 Drawing Sheets ns of the dough forming tank. In fact, an operator has difficulty in correctly assembling the tank by himself, since he must arrange and maintain it in the correct position with respect to the threaded rods of the plurality of detachable connection means, while he must tighten the corresponding locking ring nut on each threaded rod. Only after correctly tightening all the locking ring nuts he can release the manual grip of the tank. In particular, the tank that may have escaped the control of the operator, during assembly or disassembly thereof, can cause accidents, even serious ones, since it has a considerable weight and, falling from the table-top to the ground, it may also hit the operator with sharp-edged parts.

AUTOMATIC TABLE-TOP MACHINE FOR KNEADING AND EXTRUDING PASTA

This application claims priority to Italian Patent Application No. 102020000028103 filed on Nov. 23, 2020, the entire disclosure of which is incorporated herein by reference.

The present invention relates to an automatic table-top machine for kneading and extruding pasta.

PRIOR ART

An automatic table-top machine for kneading and extruding pasta is known from EP3162211 by the same holder.

The aforesaid known automatic table-top machine comprises a machine body, which includes a base, which supports a front vertical wall, a rear vertical wall and a cap hood superimposed on said walls. A mixing tank is detachably fixed in a cantilever fashion on the outer face of the front vertical wall.

The machine further comprises, underneath said hood, electric gearmotor means, which have an output shaft with a horizontal axis, and a driven shaft with an axis parallel to that of said output shaft. The driven shaft is coaxial with respect to a further kneading reel shaft, projecting externally from the machine body into said dough forming tank.

The tank has, below and parallel to the kneading reel shaft, an extrusion channel, in which a worm screw is arranged coaxial with respect to the output shaft of the gearmotor means, which rotate the screw itself.

The tank further comprises a fixed rear wall structure, which is open towards the outer face of the front vertical wall of the machine body and which has a flange outer edge, fixed with respect to the tank itself (hereinafter referred to as: rear outer edge) and juxtaposed against said outer face of the front vertical wall of the machine body.

The tank is removably fixed with respect to the machine body by means of a plurality of detachable connection means, which support it cantilevered with respect to the front vertical wall of the machine body itself.

In particular, said plurality of detachable connection means comprises, for example, four detachable connection means, which are arranged two by two symmetrically with respect to the vertical median plane of the tank, which contains the axes of the reel shaft and of the worm screw.

In particular, each detachable connection means comprises:
a threaded supporting rod, which:
  has a horizontal axis, parallel to the axes of the reel shaft and of the worm screw,
  is fixed and projects externally with respect to the front vertical wall of the machine body, and
  is arranged externally and in proximity to said rear flange outer edge of the tank, and
a manual locking ring nut, the inner thread whereof corresponds to the thread of the threaded rod and which is coupled by screwing onto the thread itself.

In the aforesaid arrangement, the locking ring nut, when screwed to the bottom with respect to the corresponding threaded rod, engages at the front a corresponding part of the said rear flange outer edge of the tank, removably fixing the tank itself, by pressing the rear flange outer edge against the outer face of the front vertical wall of the machine body.

Technical Problem

The aforesaid known automatic table-top machine first of all exhibits safety problems, in relation to the detachable connection of the dough forming tank. In fact, an operator has difficulty in correctly assembling the tank by himself, since he must arrange and maintain it in the correct position with respect to the threaded rods of the plurality of detachable connection means, while he must tighten the corresponding locking ring nut on each threaded rod. Only after correctly tightening all the locking ring nuts he can release the manual grip of the tank. In particular, the tank that may have escaped the control of the operator, during assembly or disassembly thereof, can cause accidents, even serious ones, since it has a considerable weight and, falling from the table-top to the ground, it may also hit the operator with sharp-edged parts.

On the other hand, from the mechanical point of view, the screwing of the locking ring nut on the corresponding threaded rod is performed manually and the clamping pressure of the corresponding portion of the rear flange outer edge of the tank against the front vertical wall of the machine body depends by the force applied by the operator. The clamping force of each connection means of said plurality of detachable connection means is therefore not uniquely predetermined. The tightening of said plurality of connection means may not be uniform and may compromise the stability of the tank and the parallelism of the axes of the reel shaft and of the worm screw.

Furthermore, each connection means is subject to progressive wear, due both to the tightening effort of the ring nut with respect to the threaded rod and to the repeated tightening operations during the life of the machine.

OBJECTS OF THE INVENTION

Therefore, an object of the present invention is to provide an automatic table-top machine for kneading and extruding pasta of the specified type, which allows an operator to carry out the assembly and disassembly operations of the tank in a safe and easy manner.

Another object of the present invention is to provide a machine as indicated, which allows the connection of the tank to be made correctly, without compromising the stability of the tank and the parallelism of the axes of the reel shaft and of the worm screw.

A further object of the present invention is to provide a machine as specified, which allows the wear of the detachable connection means of the tank with respect to the machine body to be considerably limited, following the repeated assembly and disassembly operations of the same during the machine life cycle.

Still another object of the present invention is to provide a machine as specified, which comprises means for the detachable connection of the tank with respect to the machine body having a simple structure, easy to use and safe to operate.

SUMMARY OF THE INVENTION

In view of these objects, the present invention provides an automatic table-top machine for kneading and extruding pasta, the essential feature whereof forms the subject of claim 1.

Further advantageous features of the present invention are described in the dependent claims.

Further features and advantages of the invention are readily apparent from the following detailed description of an embodiment of the invention with reference to the drawing, which shows important details for the invention, as well as from the claims. The features illustrated herein should not necessarily be understood to be in scale and they are represented so that the peculiarities according to the invention are clearly highlighted. The different features can be obtained individually or in any combination with each other, as variants of the invention.

EMBODIMENT EXAMPLE

Figure 1:
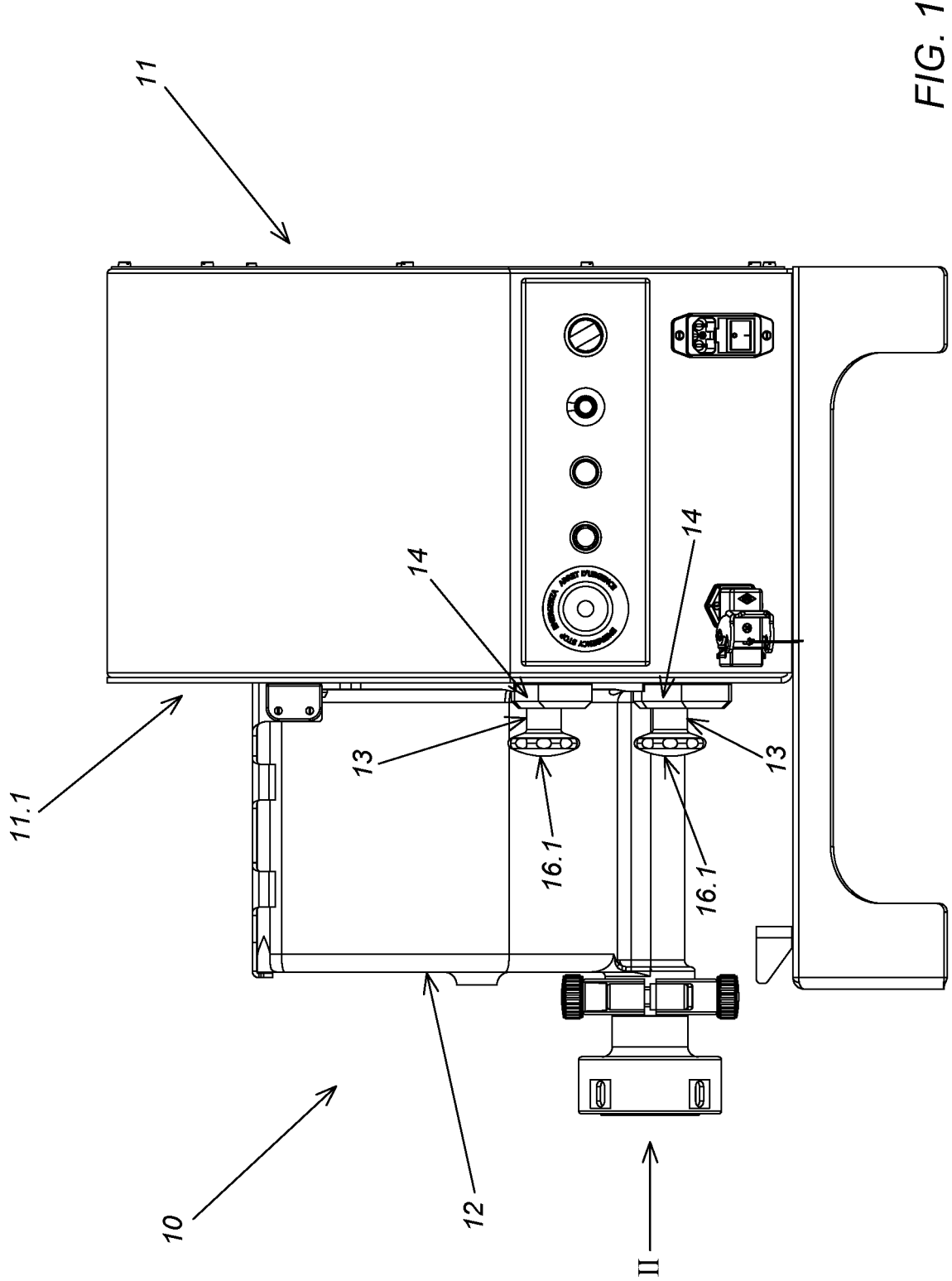
FIG. 1 is a side elevation view of the automatic table-top machine for kneading and extruding pasta, according to an embodiment of the present invention.

With reference to the drawing, reference numeral 10 indicates as a whole an automatic table-top machine for kneading and extruding pasta, according to an embodiment of the present invention.

Said machine 10 comprises:
- a machine body 11, which includes a front vertical wall 11.1;
- a dough forming tank 12, detachably fixed in a cantilever fashion on the outer face 11.10 of said front vertical wall 11.1 of the machine body 11, wherein said tank 12 comprises a fixed rear outer edge 12.1, juxtaposed against said outer face 11.10 of said vertical wall 11.1 and for example shaped as a flange;
- a plurality of detachable connection means 13, wherein said detachable connection means 13 are arranged two by two symmetrically with respect to the longitudinal vertical median plane of said tank 12, which contains the axes of a reel shaft and of a worm screw arranged in said tank.

Figure 2:
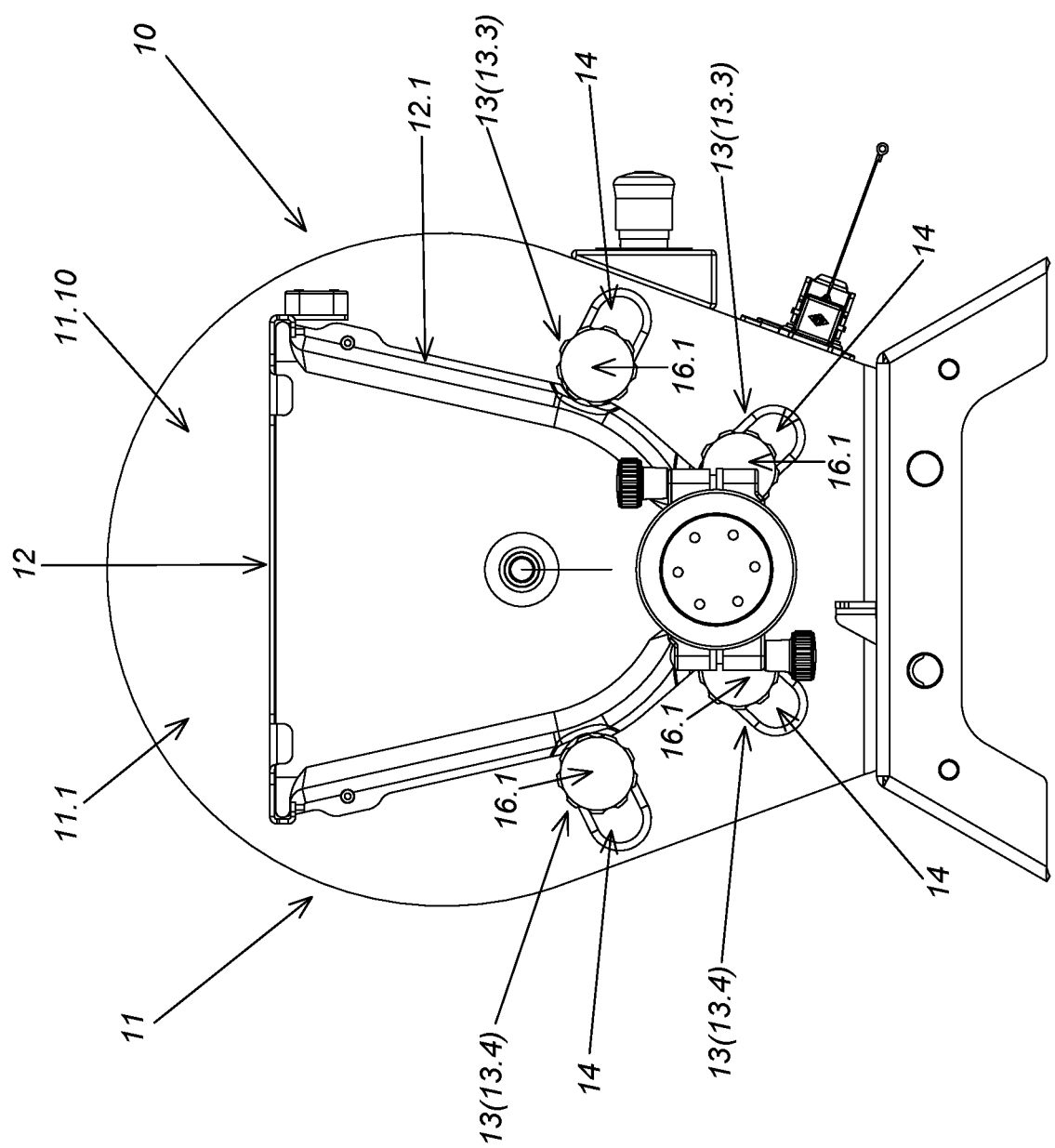
FIG. 2 is a front view of the machine in the direction of the arrow II of FIG. 1.
Figure 3:
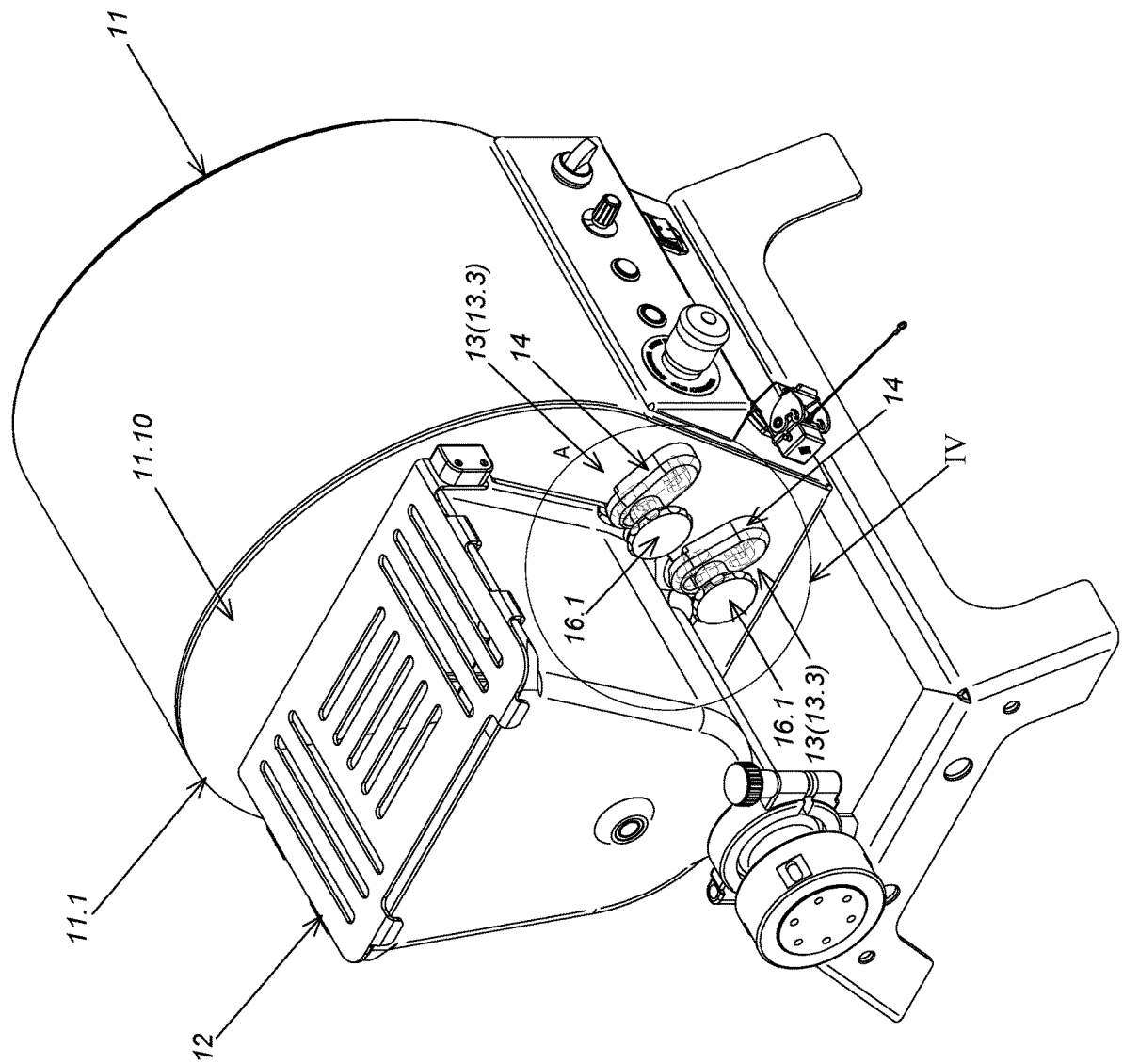
FIG. 3 is a three-quarter perspective view from above of the machine of FIG. 1, wherein the front right part of the machine itself is also shown.

In particular, with reference for example to FIG. 2, said detachable connection means 13 comprise:
- an upper right detachable connection means 13.3 and a lower right detachable connection means 13.3, identical to each other;
- an upper left detachable connection means 13.4 and a lower left detachable connection means 13.4, which are identical to each other and have mirror image symmetry, respectively and with reference to the longitudinal vertical median plane of said tank 12, with respect to said upper right detachable connection means 13.3 and to said lower right detachable connection means 13.3.

Figure 5:
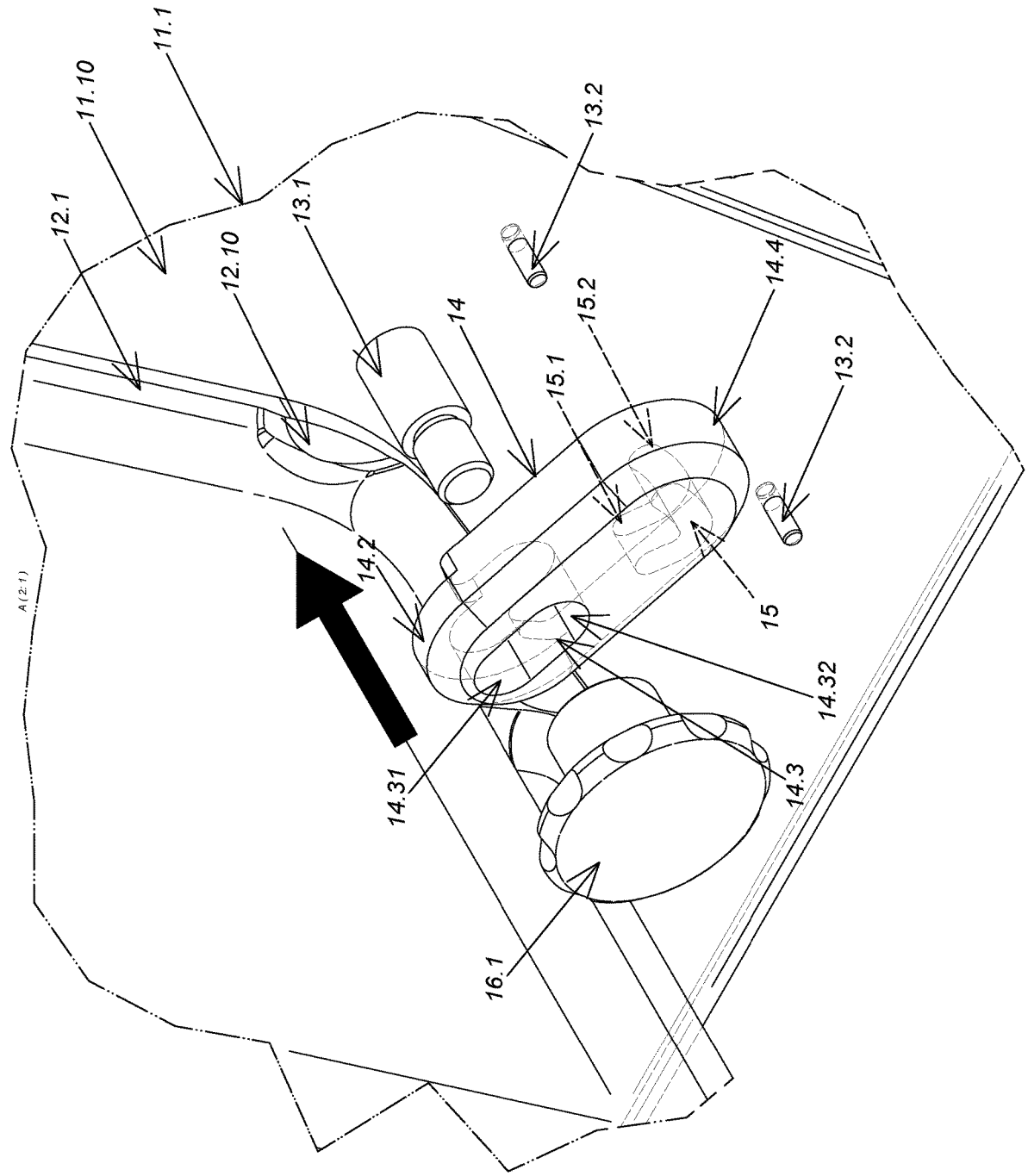
FIG. 5 is a view similar to that of FIG. 4, wherein, however, only the upper right connection means during the assembly of the tank with respect to the machine body is shown in detail and exploded view.
Figure 6:
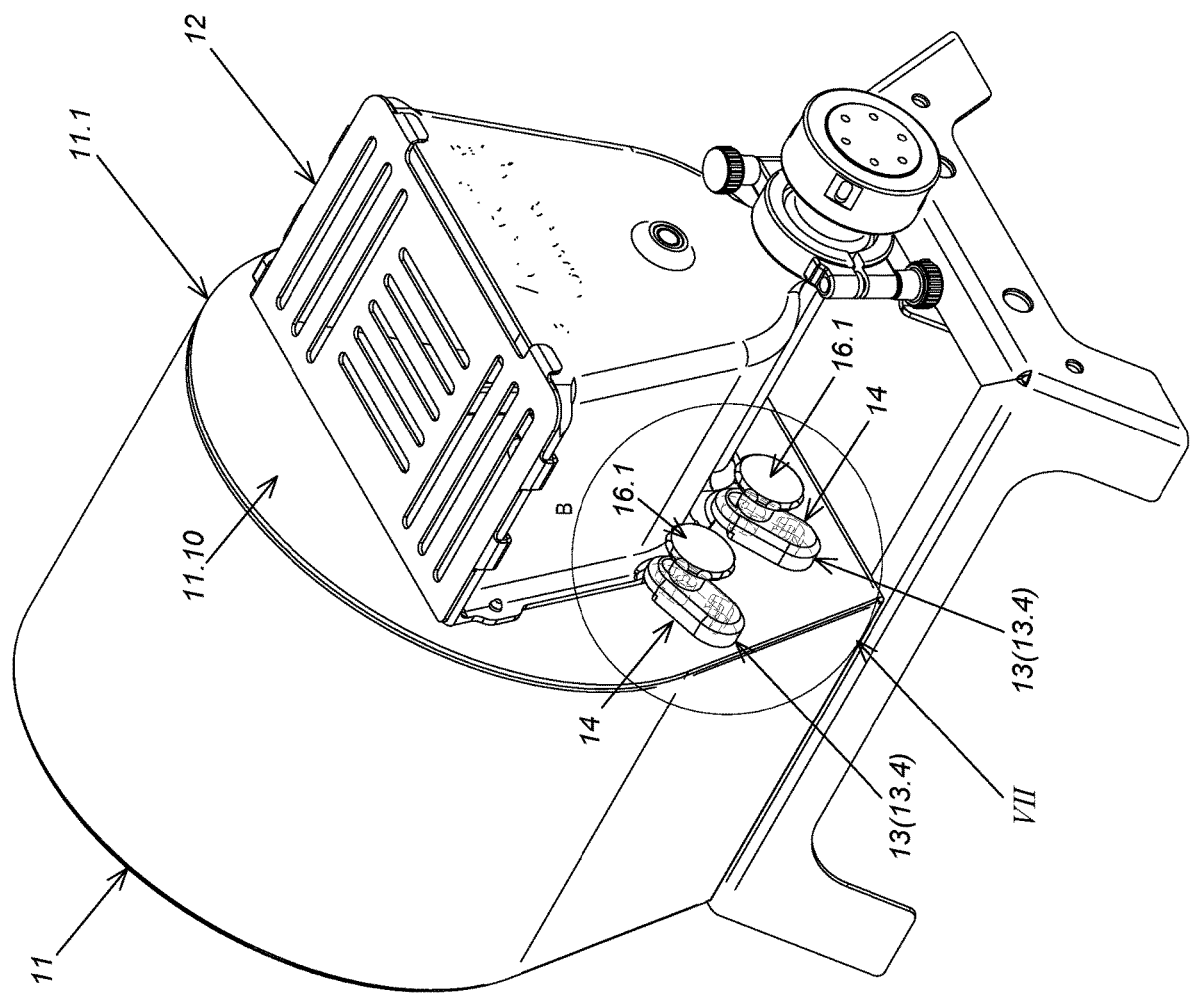
FIG. 6 is a three-quarter perspective view from above of the machine of FIG. 1, wherein the front left part of the machine itself is also shown.
Figure 8:
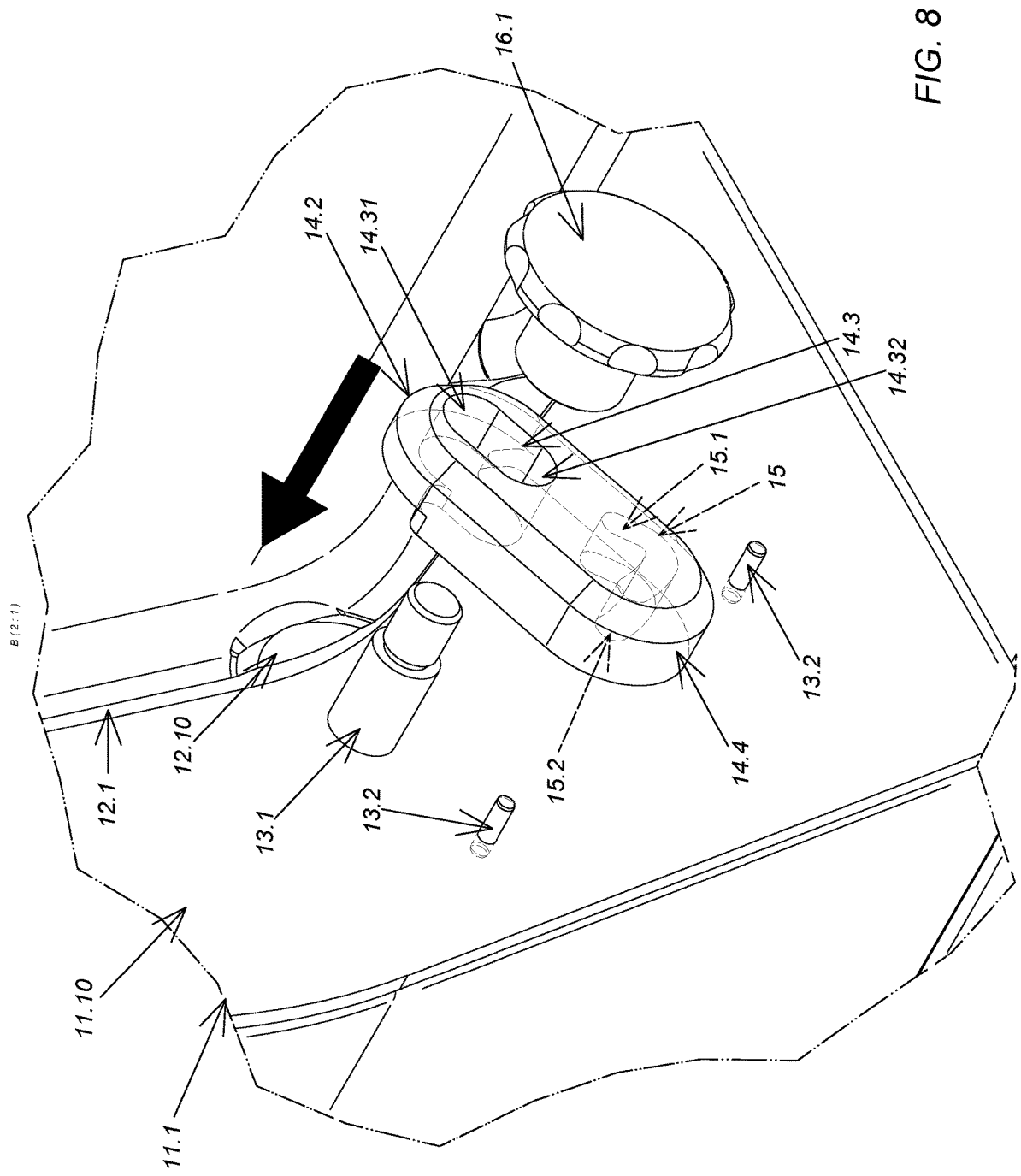
FIG. 8 is a view similar to that of FIG. 7, wherein, however, only the upper left connection means during the assembly of the tank with respect to the machine body is shown in detail and exploded view.
Figure 9:
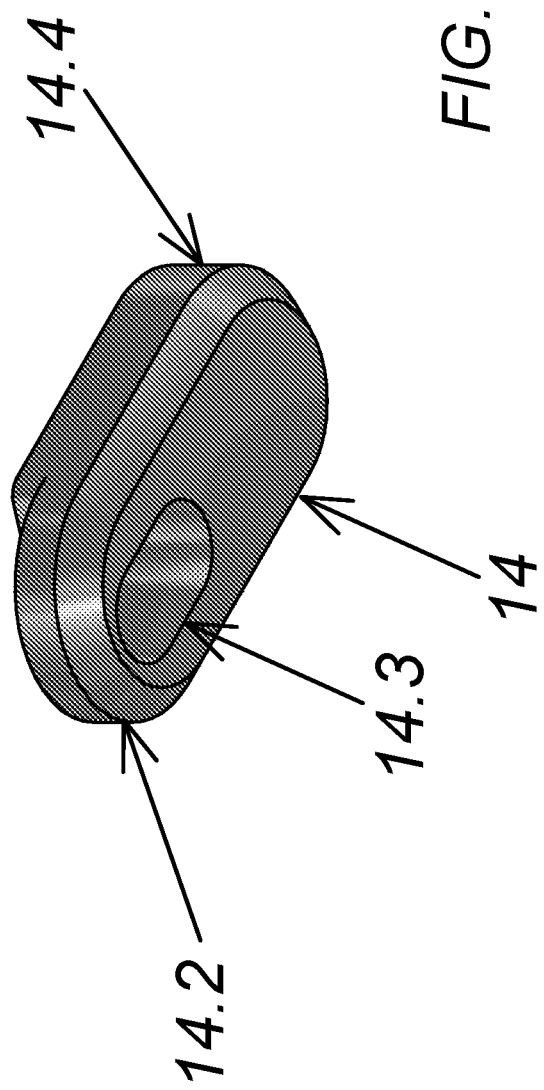
FIG. 9 is a three-quarter perspective view of a removable fixing dowel configured as a block, of the upper right and lower right connection means, respectively, as illustrated for example in FIG. 4.

Furthermore, each detachable connection means 13 (13.3, 13.4) comprises (see, for example, FIGS. 5 and 8):
- a threaded supporting rod 13.1, which has a horizontal axis, is fixed and projects externally with respect to the outer face 11.10 of said front vertical wall 11.1 of the machine body 11 and is arranged externally and proximal to said rear outer edge 12.1 of said tank 12.

Figure 4:
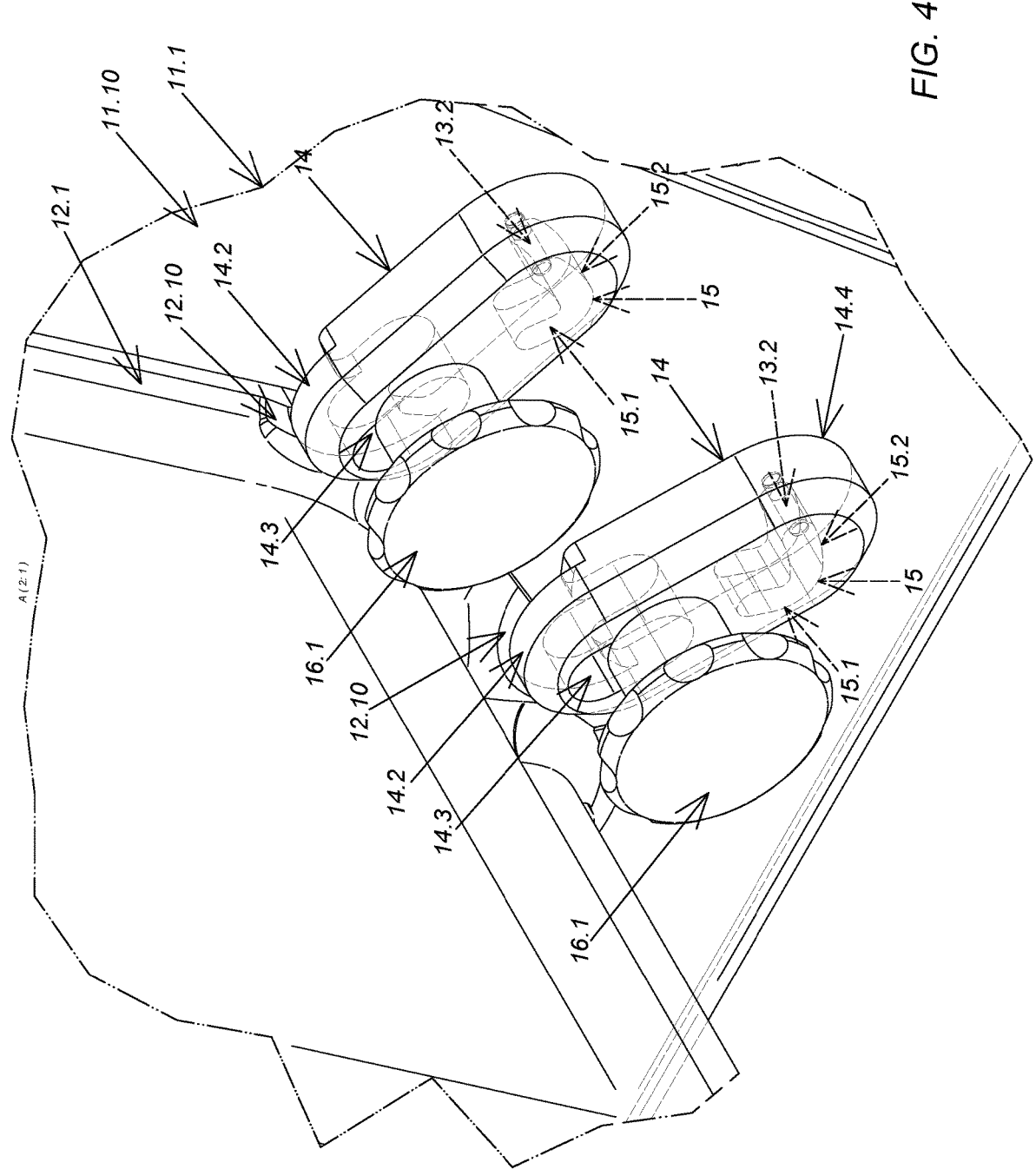
FIG. 4 is a detailed view, on a larger scale, of the detail IV of FIG. 3, wherein the detachable connection means of a dough forming tank with respect to the machine body are shown in detail, in particular an upper right detachable connection means and a lower right detachable connection means.
Figure 7:
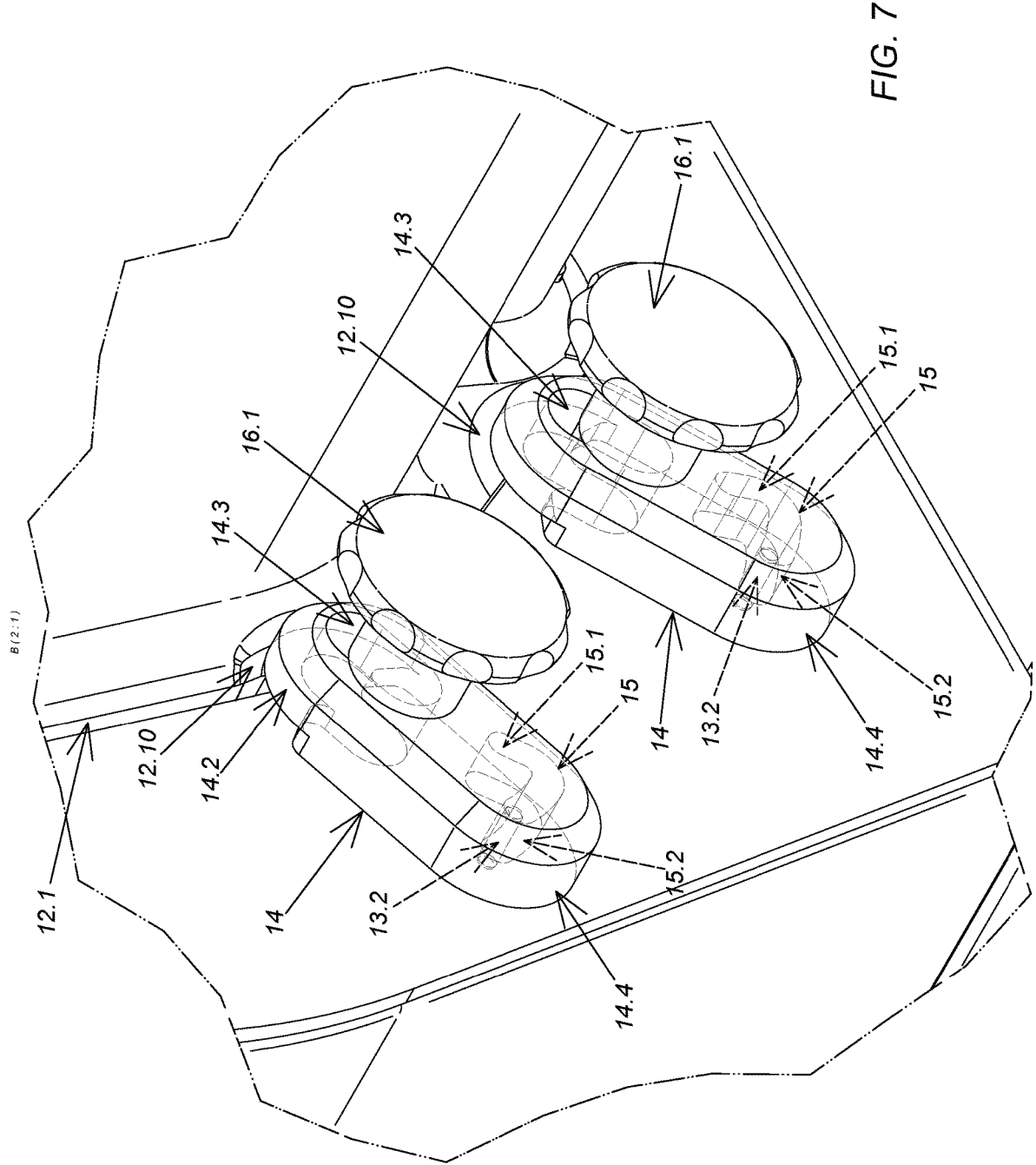
FIG. 7 is a detailed view, on a larger scale, of the detail VII of FIG. 6, wherein the detachable connection means of the dough forming tank with respect to the machine body are shown in detail, in particular an upper left detachable connection means and a lower left detachable connection means.
Figure 10:
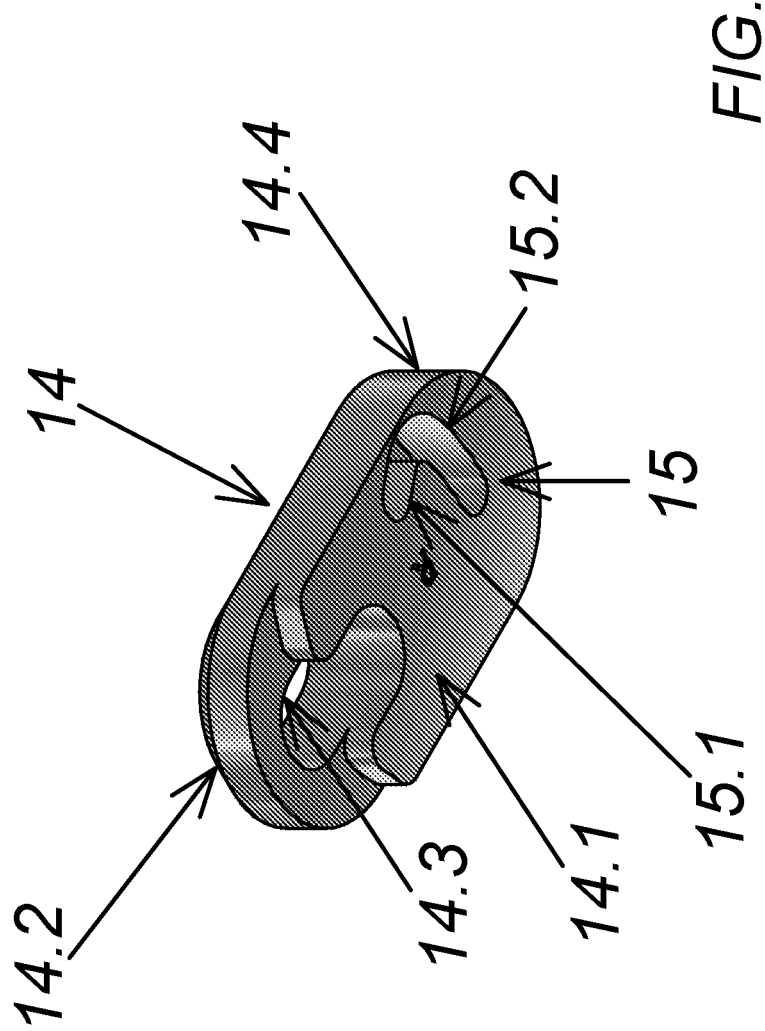
FIG. 10 is a view similar to that of FIG. 9, wherein however the connecting block is overturned with respect to said FIG. 9.
Figure 11:
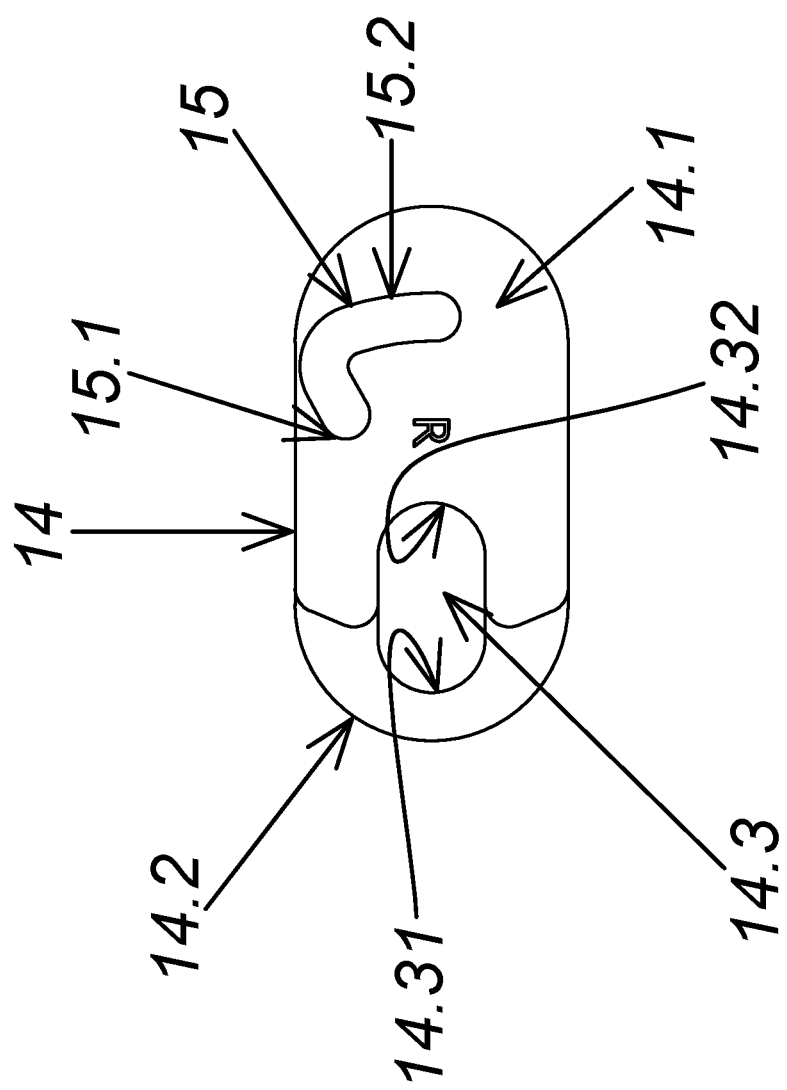
FIG. 11 is a plan view of the block of FIG. 10.
Figure 12:
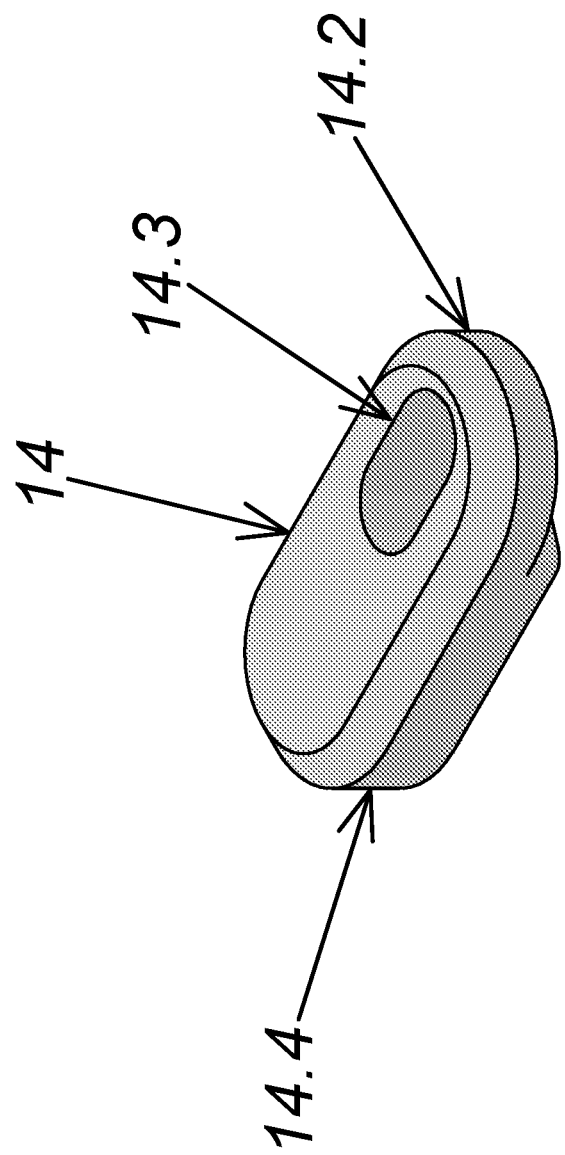
FIG. 12 is a three-quarter perspective view of a removable fixing dowel configured as a block, of the upper left and lower left connection means, respectively, as illustrated for example in FIG. 7.
Figure 13:
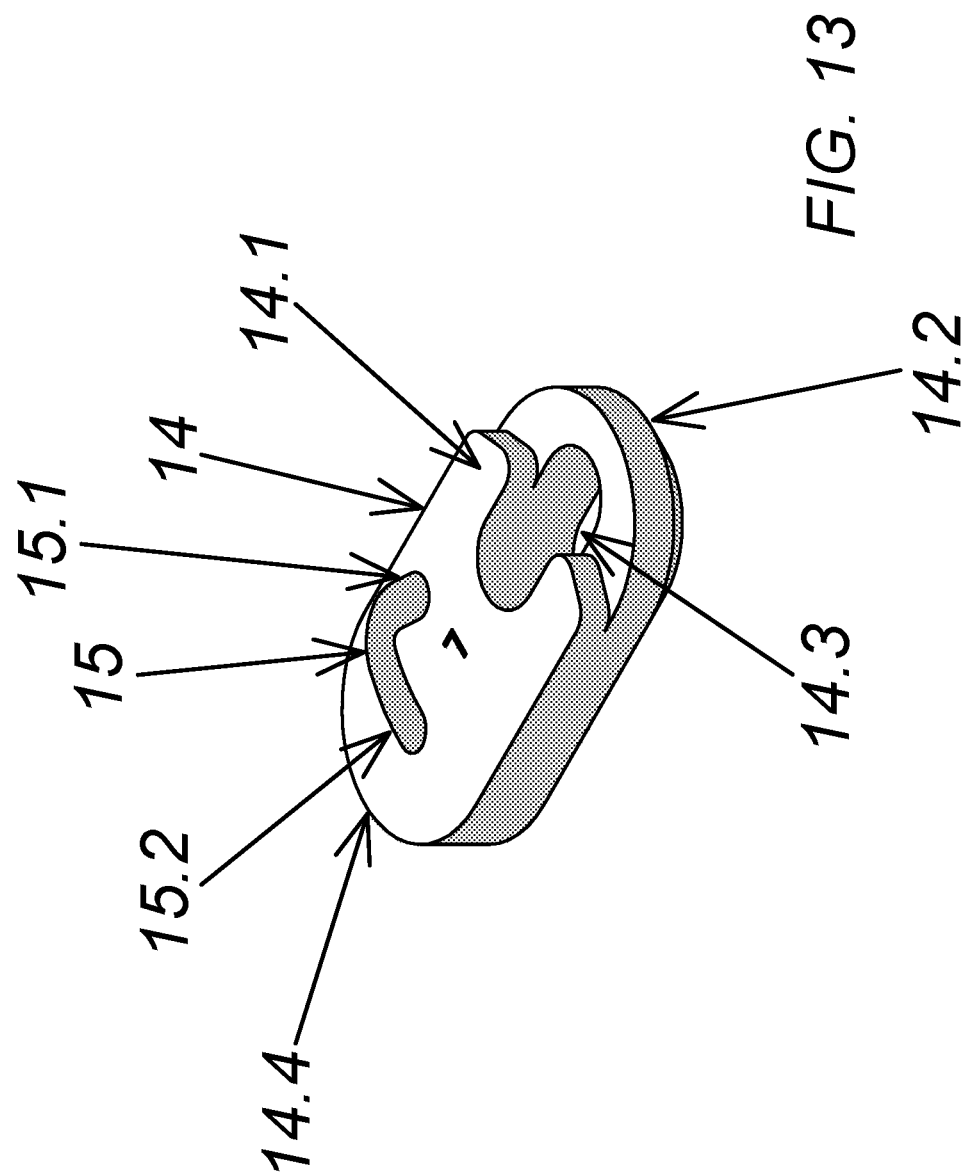
FIG. 13 is a view similar to that of FIG. 12, wherein however the connecting block is overturned with respect to said FIG. 12.
Figure 14:
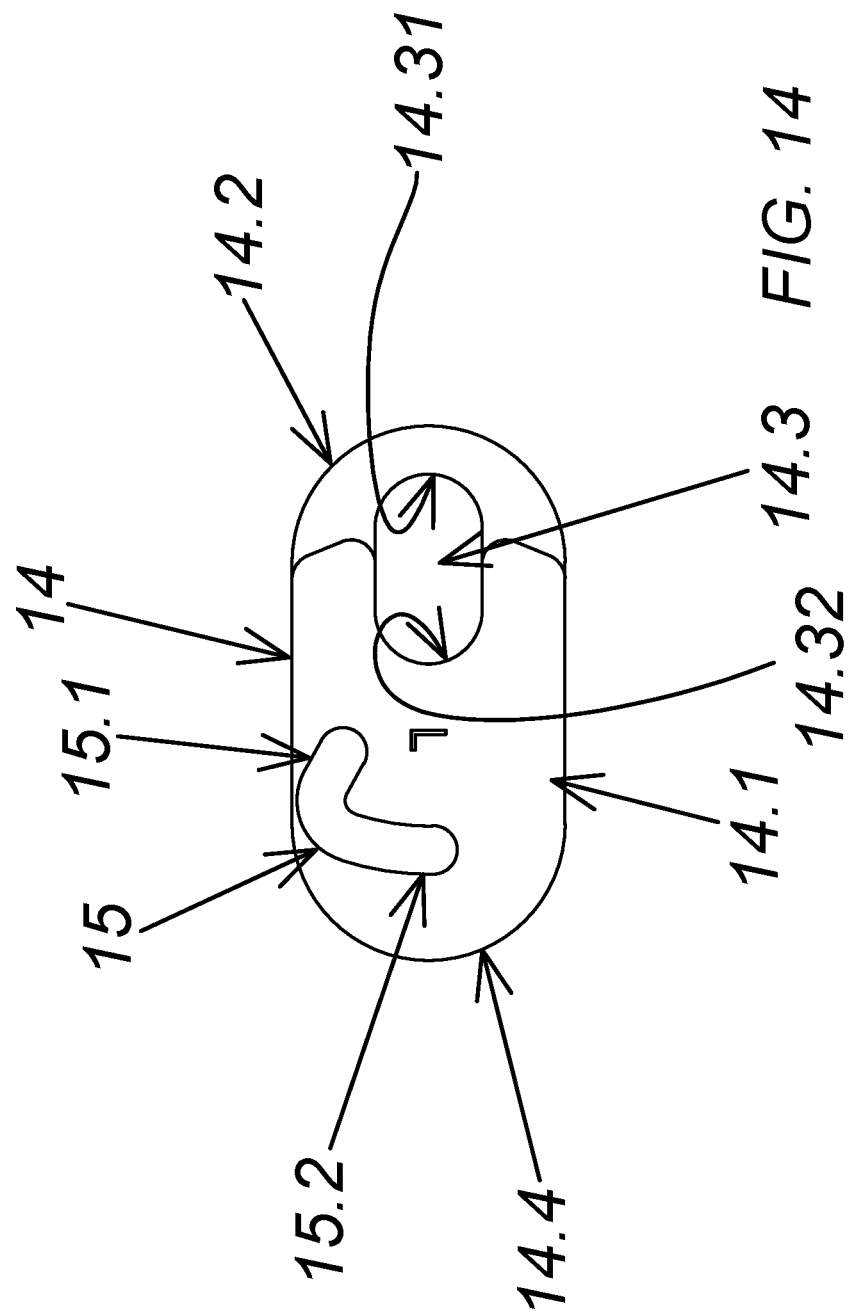
FIG. 14 is a plan view of the block of FIG. 13.
Figure 15:
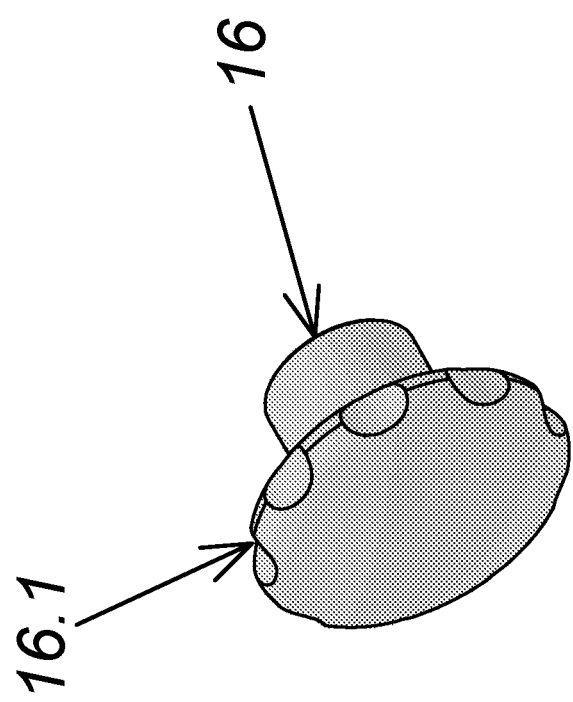
FIG. 15 is a front three-quarter perspective view of a grooved knob included, respectively, in each of the detachable connection means of the dough forming tank with respect to the machine body.

According to the present invention, each of said detachable connection means 13 (13.3, 13.4) further comprises:
- a fixed pin 13.2, which has a horizontal axis, projects externally with respect to said outer face 11.10 of said front vertical wall 11.1 of the machine body 11, is arranged externally to said tank 12 and further away with respect to said threaded rod 13.1 from said rear outer edge 12.1 of the tank 12, and its axis lies, for example, in a respective horizontal plane below the horizontal plane in which the axis of said threaded rod 13.1 lies (see, for example, FIGS. 4 and 7);
- a removable fixing dowel 14, configured as a block having:
  - at least one flat support face 14.1 (FIGS. 10, 11; 13, 14) juxtaposed at least partially against said outer face 11.10 of said front vertical wall 11.1 of the machine body 11;
  - a first end bracket portion 14.2, spaced in height with respect to said supporting face 14.1 and which can be superimposed and/or juxtaposed with respect to a corresponding portion of said rear outer edge 12.1 of said tank 12 (FIGS. 4, 7);
  - a slotted through hole 14.3 provided, at least in part, at or in proximity to, respectively, said first end bracket portion 14.2 of said dowel 14, wherein:
    - said slotted through hole 14.3 has a first semi-cylindrical inner face 14.31 with respective first axis and a second semi-cylindrical inner face 14.32 with respective second axis, wherein said first inner face 14.31 is opposite to said second inner face 14.32 and said first axis and said second axis are parallel to each other and with respect to the axis of said threaded rod 13.1;

said first semi-cylindrical inner face 14.31 of said slotted through hole 14.3 is arranged at, or in proximity to, said first end bracket portion 14.2 of said dowel 14 and said second semi-cylindrical inner face 14.32 of said slotted through hole 14.3 is distal with respect to said first end bracket portion 14.2 of said dowel 14;

said slotted through hole 14.3 is passed through by the free end of said threaded rod 13.1 and is configured to juxtapose at least a part of said free end of said threaded rod 13.1 against said second semi-cylindrical inner face 14.32, when said first end bracket portion 14.2 of said dowel 14 is superimposed and/or juxtaposed with respect to a corresponding portion of said rear outer edge 12.1 of said tank 12;

an inner cavity 15, open at least at said supporting face 14.1 of said dowel 14 and provided at, or in proximity to, a second end portion 14.4 of said dowel 14, distal with respect to said first end portion 14.2, with reference to said rear outer edge 12.1 of said tank 12, wherein:

said inner cavity 15 is structured as a channel guide having two branches connected by means of a loop and each having a respective blind end, wherein a first channel branch 15.1 is proximal with respect to said slotted through hole 14.3 and a second channel branch 15.2 is distal with respect to said slotted through hole 14.3, and wherein said loop is configured to connect said two channel branches 15.1, 15.2 without interruption to each other, and said fixed pin 13.2 is inserted in said inner cavity 15 of said dowel 14, allowing the relative movement of said dowel, said inner cavity 15 being configured:

to house said fixed pin 13.2 inside said second channel branch 15.2 of said inner cavity 15 (FIGS. 4, 7), when said first end bracket portion 14.2 of said dowel 14 is superimposed and/or juxtaposed with respect to said rear outer edge 12.1 of said tank 12 and a portion of said free end of said threaded rod 13.1 is arranged against, or in proximity to, said second semi-cylindrical inner face 14.32 of said slotted through hole 14.3, and said dowel 14 is operatively maintained in a stable blocking position of said tank 12, through the gravity of its weight, and to house said fixed pin 13.2 inside said first channel branch 15.1 of said inner cavity 15, when said first end bracket portion 14.2 of said dowel 14 is not superimposed and/or juxtaposed with respect to said rear outer edge 12.1 of said tank 12 and a portion of said free end of said threaded rod 13.1 is arranged against, or in proximity to, said first semi-cylindrical inner face 14.31 of said slotted through hole 14.3, and said dowel 14 is operatively maintained in a position in which it allows said tank 12 to be separated with respect to said front vertical wall 11.1 of said machine body 11.

It will be noted that said second channel branch 15.2 of said inner cavity 15 is configured to engage said fixed pin 13.2 with friction at least in proximity to, respectively, at said blind end thereof.

Figure 16:
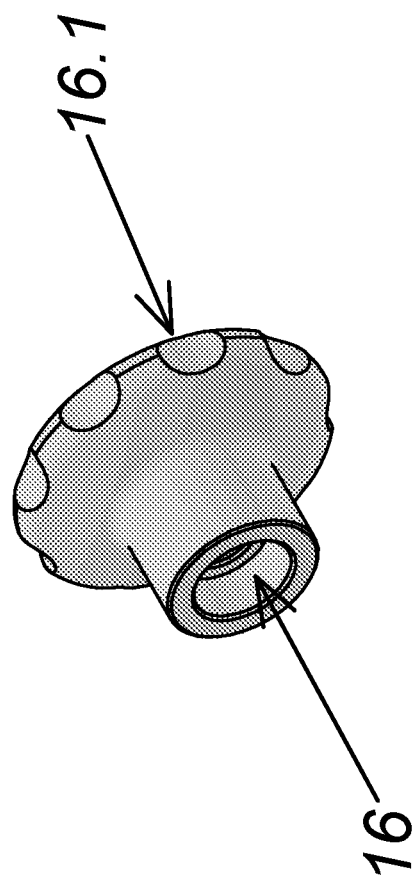
FIG. 16 is a rear three-quarter perspective view of the aforementioned grooved knob.
Figure 17:
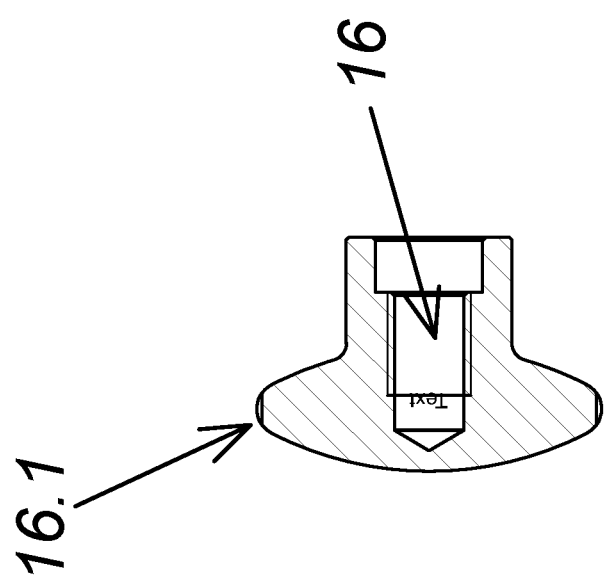
FIG. 17 is an axial sectional view of the grooved knob of FIG. 15.

A nut 16 (FIG. 16) with thread corresponding to that of said threaded rod 13.1 and provided with a handle 16.1, configured as a grooved knob, is engaged by screwing onto the portion of said same threaded rod 13.1 extending beyond said dowel 14, so as to further secure said dowel 14, at least when it is maintained in said stable blocking position of said tank 12. It will also be noted that said rear outer edge 12.1 of said tank 12 comprises four edge portions 12.10 having a stepped structure with a curvilinear riser, in each of which the end bracket portion 14.2 of a respective dowel 14 of said four detachable connection means 13 (13.3, 13.4) is superimposed and/or juxtaposed, when said dowel 14 is operatively maintained in said stable blocking position of said tank 12.

Said portions 12.10 of the rear outer edge 12.1 of said tank 12 are configured to allow the correct superimposition and/or juxtaposition of a corresponding end bracket portion 14.2 of a respective dowel 14.

In a variant, the end portion of each dowel can be arranged only in superimposition from above, or in lateral juxtaposition with respect to a corresponding portion of said rear outer edge of said dough forming tank. In this case, said end portion of each dowel can have a different shape from the bracket shape illustrated herein.

Operation

The dowel 14 of each detachable connection means 13 is moved manually by an operator, between the locking position of said tank 12 and the position in which it does not hold said tank 12. Such movement of the dowel 14 is determined automatically and is performed by the operator by making the dowel itself slide with respect to said free end of said threaded rod 13.1, so as to arrange the same end against, respectively in proximity to said second inner semi-cylindrical face 14.32 of said slotted through hole 14.3, or against, respectively, in proximity to said first inner semi-cylindrical face 14.31 of said slotted through hole 14.3.

As can be seen from the foregoing, the present invention achieves, in a simple, safe, effective and cost-effective manner, the objects set out in the introductory part of the present description.

The invention claimed is:

1. An automatic table-top machine (10) for kneading and extruding pasta, comprising:

a machine body (11), which includes a vertical wall (11.1);

a dough forming tank (12), detachably fixed in a cantilever fashion on an outer face (11.10) of said vertical wall (11.1) of the machine body (11), wherein said tank (12) comprises a fixed rear outer edge (12.1), juxtaposed against said outer face (11.10) of said vertical wall (11.1);

a plurality of detachable connection means (13; 13.3, 13.4), wherein each of said detachable connection means (13; 13.3, 13.4) comprises a threaded supporting rod (13.1), which has a horizontal axis, is fixed and projects externally with respect to the outer face (11.10) of said vertical wall (11.1) of the machine body (11) and is arranged externally with respect to said rear outer edge (12.1) of said tank (12);

characterized in that each of said detachable connection means (13; 13.3, 13.4) further comprises:

a fixed pin (13.2), which has a horizontal axis, projects externally with respect to said outer face (11.10) of said vertical wall (11.1) of the machine body (11), and is arranged externally to said tank (12);

a removable fixing dowel (14), configured as a block having:

at least one supporting face (14.1), which is juxtaposed at least partly against said outer face (11.10) of said vertical wall (11.1) of the machine body (11);

a first end portion (14.2), which can be superimposed and/or juxtaposed with respect to a corresponding portion of said rear outer edge (12.1) of said tank (12);

a slotted through hole (14.3) provided in said dowel (14), wherein:

a first semicylindrical inner face (14.31) of said slotted through hole (14.3) is arranged at, or in proximity to, said first end portion (14.2) of said dowel (14) and a second semicylindrical inner face (14.32) of said slotted through hole (14.3) is distal with respect to said first end portion (14.2) of said dowel (14);

said slotted through hole (14.3) is passed through by a free end of said threaded rod (13.1) and is configured to juxtapose at least a part of said free end of said threaded rod (13.1) against said second semicylindrical inner face (14.32), when said first end portion (14.2) of said dowel (14) is superimposed and/or juxtaposed with respect to a corresponding portion of said rear outer edge (12.1) of said tank (12);

an inner cavity (15), open at least at said supporting face (14.1) of said dowel (14) and provided at, or in proximity to, a second end portion (14.4) of said dowel (14), distal with respect to said first end portion (14.2), with reference to said rear outer edge (12.1) of said tank (12), wherein:

said inner cavity (15) is structured as a channel guide having two branches connected by means of a loop and each having a respective blind end, wherein a first channel branch (15.1) is proximal with respect to said slotted through hole (14.3) and a second channel branch (15.2) is distal with respect to said slotted through hole (14.3), and wherein said loop is configured to connect said two channel branches (15.1, 15.2) without interruption to each other, and said fixed pin (13.2) is inserted in said inner cavity (15) of said dowel (14), allowing a relative movement of said dowel, said inner cavity (15) being configured:

to house said fixed pin (13.2) inside said second channel branch (15.2) of said inner cavity (15), when said first end portion (14.2) of said dowel (14) is superimposed and/or juxtaposed with respect to said rear outer edge (12.1) of said tank (12) and a portion of said free end of said threaded rod (13.1) is arranged against, or in proximity to, said second semicylindrical inner face (14.32) of said slotted through hole (14.3), and said dowel (14) is operatively maintained in a stable blocking position of said tank (12), through gravity of said tank's weight, and to house said fixed pin (13.2) inside said first channel branch (15.1) of said inner cavity (15), when said first end portion (14.2) of said dowel (14) is not superimposed and/or juxtaposed with respect to said rear outer edge (12.1) of said tank (12) and a portion of said free end of said threaded rod (13.1) is arranged against, or in proximity to, said first semicylindrical inner face (14.31) of said slotted through hole (14.3), and said dowel (14) is operatively maintained in a position in which it allows said tank (12) to be separated with respect to said front vertical wall (11.1) of said machine body (11).

2. The automatic machine (10) according to claim 1, characterized in that said detachable connection means (13, 13.3, 13.4) are arranged with two right detachable connection means (13.3) and two left detachable connection means (13.4) symmetrically with respect to a longitudinal vertical median plane of said tank (12), and comprise at least:

an upper right detachable connection means (13.3) and a lower right detachable connection means (13.3), identical to each other;

an upper left detachable connection means (13.4) and a lower left detachable connection means (13.4), which are identical to each other and have mirror image symmetry, respectively and with reference to the longitudinal vertical median plane of said tank (12), with respect to said upper right detachable connection means (13.3) and to said lower right detachable connection means (13.3).

3. The automatic machine (10) according to claim 1, characterized in that said fixed pin (13.2) is arranged farther than said threaded rod (13.1) with respect to said rear outer edge (12.1) of the tank (12) and its axis lies on a horizontal plane underneath and with respect to the horizontal plane on which the axis of said threaded rod (13.1) lies.

4. The automatic machine (10) according to claim 1, characterized in that said first end portion (14.2) of said dowel (14) has a bracket structure, spaced in height with respect to said supporting face (14.1), and can be superimposed and/or juxtaposed with respect to said rear outer edge (12.1) of said tank (12).

5. The automatic machine (10) according to claim 1, characterized in that said rear outer edge (12.1) of said tank (12) comprises edge portions (12.10) having a stepped structure, in each of which said first end portion (14.2) of a respective dowel (14) of the said detachable connection means (13; 13.3, 13.4) is superimposed and/or juxtaposed, when said respective dowel (14) is operatively maintained in a stable blocking position of said tank (12).

6. The automatic machine (10) according to claim 4, characterized in that each of said portions (12.10) of the rear outer edge (12.1) of said tank (12) is configured to allow a superimposing and/or juxtaposing of a corresponding end bracket portion (14.2) of a respective dowel (14).

7. The automatic machine (10) according to claim 1, characterized in that said slotted through hole (14.3) is provided, at least in part, at, or in proximity to, said first end portion (14.2) of said dowel (14); said first semicylindrical inner face (14.31) of said slotted through hole (14.3) is arranged at, or in proximity to, said first end portion (14.2) of said dowel (14) and said second semicylindrical inner face (14.32) of said slotted through hole (14.3) is distal with respect to said first end portion (14.2) of said dowel (14), and said first inner face (14.31) is opposite said second inner face (14.32) and respective axes of said inner faces (14.31, 14.32) are parallel to each other and with respect to an axis of said threaded rod (13.1).

8. The automatic machine (10) according to claim 1, characterized in that comprises, for each of said detachable connection means (13; 13.3, 13.4), a nut (16) with thread corresponding to that of said threaded rod (13.1) and provided with a handle (16.1), configured as a grooved knob, which is engaged by screwing onto a portion of said threaded rod (13.1) extending beyond said dowel (14), so as to further secure said dowel (14), at least when it is maintained in said stable blocking position of said tank (12).

9. The automatic machine (10) according to claim 1, characterized in that the dowel (14) of each detachable connection means (13) can be moved, manually, between a position in which said dowel blocks said tank (12) and a position in which said dowel (14) does not retain said tank (12), wherein the movement of said dowel (14) is determined, automatically, by sliding the dowel with respect to said free end of said threaded rod (13.1), so as to arrange the free end of said threaded rod (13.1) against, or in proximity to, said second semicylindrical inner face (14.32) of said slotted through hole (14.3), or against, or in proximity to, said first semicylindrical inner face (14.31) of said slotted through hole (14.3).

10. The automatic machine (10) according to claim 5, characterized in that each of said portions (12.10) of the rear outer edge (12.1) of said tank (12) is configured to allow a superimposing and/or juxtaposing of a corresponding end bracket portion (14.2) of a respective dowel (14).

\* \* \* \* \*